United States Patent [19]

Pall

[11] Patent Number: 4,965,032
[45] Date of Patent: Oct. 23, 1990

[54] FILTER DEVICE WITH NON-BYPASS EDGE SEAL

[75] Inventor: David B. Pall, Roslyn Estates, N.Y.

[73] Assignee: Pall Corporation, Glen Cove, N.Y.

[21] Appl. No.: 407,759

[22] Filed: Sep. 15, 1989

[51] Int. Cl.$^5$ ............................................. B29D 9/00
[52] U.S. Cl. ........................................ 264/160; 29/447;
55/523; 264/230; 264/249; 264/257
[58] Field of Search .................... 55/482, 486, 487;
210/488, 489, 491, 508; 264/157, 230, 249, 257,
258; 29/523

[56] References Cited

U.S. PATENT DOCUMENTS

| | | | |
|---|---|---|---|
| 2,541,838 | 2/1951 | Shardlow | 55/523 |
| 2,821,261 | 1/1958 | Vixler et al. | 55/523 |
| 3,397,871 | 8/1968 | Hasselberg | 55/523 |
| 3,935,111 | 1/1976 | Bentley | 210/446 |
| 4,115,277 | 9/1978 | Swank | 210/436 |
| 4,116,845 | 9/1978 | Swank | 210/446 |
| 4,157,967 | 6/1979 | Meyst et al. | 210/449 |
| 4,294,599 | 10/1981 | Grovesteen et al. | 55/485 |
| 4,759,110 | 7/1988 | Rieger et al. | 29/447 |
| 4,904,285 | 2/1990 | Yamada et al. | 55/523 |
| 4,907,330 | 3/1990 | Akao et al. | 29/447 |

FOREIGN PATENT DOCUMENTS 1575753 9/1980 United Kingdom .
2055616 3/1981 United Kingdom .

*Primary Examiner*—Willard Hoag
*Attorney, Agent, or Firm*—Leydig, Voit & Mayer

[57] ABSTRACT

A process for making filters with a non-bypassing peripheral seal which comprises heating a cylindrical filter housing to expand its internal diameter; inserting a filter disc that has a diameter larger than that of the internal diameter of the housing when cold; and allowing the assembly to cool.

7 Claims, No Drawings

FILTER DEVICE WITH NON-BYPASS EDGE SEAL

BACKGROUND OF THE INVENTION

This invention relates to filters and specifically to fibrous depth filters of the kind in which one or more preformed, integral filter elements are fitted into a housing. Such filters are inter alia encountered in the filtration of blood products, and are described, for example, in copending U.S. patent application Ser. No. 07/259,773 filed on Oct. 19, 1988 and now U.S. Pat. No. 4,925,572.

Depth filters are capable of removing specified components of a mixture with a high level of efficiency. It will be apparent, however, that this efficiency will be of little value if the component to be filtered is able to escape by passing around the edges of, rather than through, the tangle of fibers that forms the depth filter.

It is known to seek to avoid this result by forming the filter element actually in the barrel of the device by forcing a mass of fibers into an elongated cylindrical container. Because it is difficult to manipulate fibers in a uniform reproducible manner, this can, in addition to resulting in a filter with uneven filtering characteristics, allow bypassing adjacent the wall of the container.

Filters have also been made commercially in which multiple layers of media in sheet form have been edge sealed by compression between internal flanges. Such assemblies tend to be poorly sealed unless the flange is of sufficient width, in which case a substantial proportion of the filter area is lost because fluid access to the peripheral areas under the flange is poor.

Copending U.S. application Ser. No. 07/259,773 (referred to above and called hereinafter '773) is directed to a leucocyte depletion filter with an efficiency of 99.9 to 99.99% and uses a filter disc in the form of a right circular cylinder assembled into a cylindrical housing of lateral dimension 0.1 to 1% smaller than the filter disc, i.e., into a housing with an interference fit.

The problems can be best appreciated by considering the requirement of obtaining efficiencies in the range of 99.999 to 99.99999% in removing leucocytes from red cell concentrate during blood processing. Filters for this purpose tend to be comparatively thick, for example, in excess of 3 mm, and may comprise in addition a prefilter of thickness of up to 1 mm or more. In order to be effective, a flange 4 mm wide may be needed; in a typical filter with 60 cm$^2$ of effective flow area, the effective area lost under the flange would be about 9 cm$^2$, or about 15% of the total area.

This invention is directed to an edge sealing system compatible with filters with efficiencies up to about 99.9999%, for which an interference fit such as is described in the '773 application provides sealing that tends to be inadequate.

This invention provides an edge sealing method that permits the consistent production of filters of a constant uniform quality and performance, and with excellent resistance to bypassing around the elements.

Description of the Invention

The invention comprises a process for the production of a filter assembly which comprises heating a cylindrical housing to a temperature such that its dimensions are significantly expanded but below the temperature at which the housing may become distorted; inserting into the housing a filter disc with a diameter that is larger than the interior diameter of the housing at ambient temperature and allowing the housing to cool to ambient temperature. The disc is preferably at ambient temperature or lower as it is inserted into the heated housing.

At temperatures of from about 20° to about 100° C., the coefficients of thermal expansion of plastics from which housings could be made range from about 1 to $2 \times 10^{-5}$/°C., for a typical glass or carbon fiber reinforced plastic, to about $20 \times 10^{-5}$/°C. for unreinforced plastics. Many plastics suitable for injection molding have expansion coefficients of at least about $3 \times 10^{-5}$/°C. and preferably in the range of about 6 to about $10 \times 10^{-5}$/°C. Of these, most can be heated to about 70° C. without distortion, and some, for example, polybutylene terephthalate (PBT), will withstand heating to as high as 210° C. In the case of PBT, which has an expansion coefficient in excess of about $6 \times 10^{-5}$/°C., a PBT housing will expand by $6 \times 10^{-5} \times (210-20) \times 100 = 1.1\%$. If such a housing were 10 cm in diameter, the diametric expansion due to heating would be $0.011 \times 10 = 0.11$ cm, sufficient to apply, after assembly and cooling, a large compressive force to the circumference of an inserted disc sized to fit the housing exactly at the elevated temperature.

The material from which the fiber is made can be a glass or other mineral fiber or, more preferably, a thermoplastic polymer. Examples of suitable thermoplastic polymers include a polyamide, such as nylon 6 or nylon 66; a polyolefin, such as polypropylene; a polyester, such as polyethylene terephthalate (PET) or polybutylene terephthalate (PBT); a polycarbonate or a fluorinated polymer, such as polytetrafluoroethylene or a polyfluoroacrylate polymer. Preferred polymers are polypropylene and polybutylene terephthalate.

If desired, several discs of differing pore size can be compressed into a single unit for insertion in the housing. This is often a preferred feature of the invention. Alternatively, and sometimes preferably, discs of different densities, but of essentially the same diameter, can be prepared and inserted one on top of the other in the filter housing in order of increasing pore size, with the smallest pore size at the bottom.

For the seal to be effective, the disc must be capable of retaining its cylindrical form as it is diametrically compressed during cooling. Such a disc can, for example, be made by making a "lay-up" comprising a number of layers of melt blown web, compressing the lay-up while hot to increase its density and obtain adhesion between contacting fiber surfaces, and then cutting from the resulting laminate a disc of right cylindrical form. Such a disc is referred to hereinafter as a preformed filter element.

The preformed filter element is preferred to be of diameter equal to or slightly larger than the diameter of the heated housing; however, it should not be so much larger as to make assembly difficult or to distort the element during assembly. Depending on the characteristics of the preformed element, assembly can be accomplished of an element up to about 0.2% larger in diameter compared with the heated housing.

Discs cut from laminates having voids volumes of from about 65% to about 85% are well suited for use in the process of this invention.

Description of Preferred Embodiments

The invention is now further described with specific reference to certain embodiments. It is to be understood, however, that these embodiments are provided for the purpose of illustration only and are intended to imply no limitation on the essential scope of the invention.

Example

A filter disc with an ambient temperature diameter of 3.517 inches was cut from a sheet that had been hot formed from 2.6 μm diameter polybutylene terephthalate fibers to a voids volume of 75% and a thickness of 0.36 cm. A housing made from acrylic resin with an ambient temperature internal diameter of 3.498 inches and a linear coefficient of expansion of $7\times10^{-5}/°C.$ was heated to 70° C. The disc was inserted into the hot housing, which was then allowed to cool to ambient temperature. A tight non-bypass edge seal was achieved without buckling of the disc.

By contrast, attempts to press the disc into the unheated housing led to buckling of the disc and a similar disc of 3.505 inches diameter did not buckle but provided an inadequate edge seal.

The present invention has been described largely in terms of cylindrical housings and right cylindrical discs of a filter element. This has been for the sake of simplicity. Clearly, however, the process of the invention could readily be adapted for use with filter elements and housings of square, oblong, or oval cross-section, or any other convenient shape, without departing from the essential process of this invention.

What is claimed is:

1. A process for the production of a filter unit, said filter unit comprising at least one nonwoven fibrous filter disc element in a tight fit with the interior wall of a cylindrical filter housing made from a material with a positive coefficient of expansion at temperatures from about 0° to about 100° C. of at least about $3\times10^{-5}/°C.$, comprising:

(a) compressing a sheet of a non-woven fibrous material while in a heat softened state to a desired density;
    (b) cutting a filter element disc from such compressed sheet with a diameter from about 0.2 to about 1% greater than the interior diameter of the filter housing at ambient temperature;
    (c) heating the housing to an elevated temperature at which its interior diameter exceeds the diameter of the disc at ambient temperature;
    (d) inserting the filter element disc into the housing while maintaining the housing at the elevated temperature; and
    (e) allowing the assembly to cool to ambient temperature.

2. The process according to claim 1 in which the interior diameter of the heated housing is within about 2% of the ambient temperature diameter of the disc.

3. The process according to claim 1 in which the disc is cut from laminated sheet compressed to a voids volume in the range of from about 65% to about 85%.

4. The process according to claim 1 in which the filter disc is made from polybutylene terephthalate fibers.

5. The process according to claim 1 in which a plurality of discs with differing porosities are inserted into the housing in increasing order of porosity from the bottom to the top.

6. The process according to claim 1 in which the disc is a preformed filter element comprising a plurality of layers with differing porosities.

7. The process according to claim 1 in which the disc is at or below ambient temperature when it is inserted into the heated housing.

* * * * *

UNITED STATES PATENT AND TRADEMARK OFFICE
CERTIFICATE OF CORRECTION

PATENT NO. : 4,965,032

DATED : October 23, 1990

INVENTOR(S) : David B. Pall

It is certified that error appears in the above-identified patent and that said Letters Patent is hereby corrected as shown below:

Column 4, line 20, change "2%" to --0.2%--.

Signed and Sealed this

Fifth Day of May, 1992

Attest:

DOUGLAS B. COMER

Attesting Officer

Acting Commissioner of Patents and Trademarks